(12) United States Patent
Podpaly et al.

(10) Patent No.: US 9,746,101 B2
(45) Date of Patent: Aug. 29, 2017

(54) VALVE POSITIONER COMMUNICATION METHOD UTILIZING TWO-DIMENSIONAL GRAPHICAL DISPLAY

(71) Applicant: Dresser, Inc., Huston, TX (US)

(72) Inventors: Anatoly Podpaly, Sharon, MA (US); Justin Scott Shriver, Newton, MA (US)

(73) Assignee: Dresser, Inc., Addison, TX (US)

( * ) Notice: Subject to any disclaimer, the term of this patent is extended or adjusted under 35 U.S.C. 154(b) by 119 days.

(21) Appl. No.: 14/719,537

(22) Filed: May 22, 2015

(65) Prior Publication Data

US 2016/0341333 A1    Nov. 24, 2016

(51) Int. Cl.
*F16K 37/00*    (2006.01)

(52) U.S. Cl.
CPC ................ *F16K 37/0058* (2013.01)

(58) Field of Classification Search
None
See application file for complete search history.

(56) References Cited

U.S. PATENT DOCUMENTS

| 5,223,822 | A * | 6/1993 | Stommes ............ F16K 37/0008 |
| | | | 116/277 |
| 6,236,334 | B1 | 5/2001 | Tapperson et al. |
| 7,886,766 | B2 | 2/2011 | Radonsky et al. |
| 8,272,281 | B2 | 9/2012 | McCarty |
| 8,762,618 | B2 | 6/2014 | Burr et al. |
| 2014/0100673 | A1 | 4/2014 | Amirthasamy et al. |
| 2014/0130878 | A1 | 5/2014 | Marinez |
| 2015/0268470 | A1* | 9/2015 | Yang .................... G02B 27/017 |
| | | | 345/8 |
| 2016/0057135 | A1* | 2/2016 | Jiang ................... H04L 63/0853 |
| | | | 713/172 |
| 2016/0163288 | A1* | 6/2016 | Ushijima ................ G06F 3/147 |
| | | | 345/619 |

* cited by examiner

*Primary Examiner* — Nicholas Lee
(74) *Attorney, Agent, or Firm* — Paul Frank + Collins P.C.

(57) ABSTRACT

A valve positioning system for controlling a valve and exchanging information related to the valve is provided. The valve positioning system includes a valve positioner in operative association with the valve such that the valve positioner receives status information related to the valve. The valve positioner includes a graphical display that displays a graphical representation based on the status information. By displaying the graphical representation, the valve positioner optically transmits the status information to a computing device that is in a line of sight with the graphical display of the valve positioner.

14 Claims, 5 Drawing Sheets

VALVE POSITIONER COMMUNICATION METHOD UTILIZING TWO-DIMENSIONAL GRAPHICAL DISPLAY

BACKGROUND

Valves can be used to control fluid flow, steam flow, gas flow, etc. by moving between an opened position, a partially opened position, and a closed position. When the valve is in the opened position and/or the partially opened position, fluid flow, steam flow, gas flow, etc. can move through a pipe, tube, etc. past the valve. When the valve is in the closed position, fluid flow, steam flow, gas flow, etc. is prevented from moving through the pipe, tube, etc. past the valve. To control the position of a valve, an actuator may be provided. In some examples, the actuator includes a pneumatic actuator that converts energy (e.g., compressed air) into mechanical motion that causes the valve to move between the opened position, the partially opened position, and the closed position.

At times, information related to the valve, the actuator, etc. can be transmitted to a user. Due to a large number of valves in a small area, wireless transmission (e.g., using Bluetooth, radio waves, etc.) of this information can be challenging. For example, a wireless device (e.g., mobile device, etc.) that is used by the user can inadvertently communicate with multiple and/or unintended valve positioning systems within the same area (e.g., crosstalk). Thus, it would be useful to provide a valve positioning system that can communicate with a computing device when the computing device is in a line of sight with the valve positioning system, thus: (1) limiting the likelihood of crosstalk, (2) limiting and/or eliminating the potential for malicious interception (e.g., eavesdropping) and (3) increasing security since the line of sight communication can have direct physical access to the resource.

SUMMARY

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The disclosure herein generally relates to a valve positioner, and, more particularly, relates to a valve positioner that optically communicates information related to a valve with a graphical display. In accordance with one aspect, the present disclosed subject matter provides a valve positioning system for controlling a valve and exchanging information related to the valve. The valve positioning system includes a valve positioner in operative association with the valve such that the valve positioner is configured to receive status information related to the valve. The valve positioner includes a graphical display that is configured to display a graphical representation based on the status information. By displaying the graphical representation, the valve positioner is configured to optically transmit the status information.

In accordance with another aspect, the present disclosed subject matter provides a valve positioning system for controlling a valve and exchanging information related to the valve. The valve positioning system includes a valve positioner in operative association with the valve such that the valve positioner is configured to receive status information related to the valve. The valve positioner includes a graphical display that is configured to display a graphical representation based on the status information and display a second graphical representation based on the status information within a period of time after the graphical representation is displayed. By displaying the graphical representation and the second graphical representation, the valve positioner is configured to optically transmit the status information to a computing device that is in a line of sight with the graphical display of the valve positioner.

In accordance with yet another aspect, the present disclosed subject matter provides a method of exchanging information related to a valve in a valve positioning system. The method includes receiving information at a valve positioner that is related to the valve. The method includes transmitting the information by displaying a graphical representation on a graphical display of the valve positioner. The graphical representation is based on status information related to the valve.

BRIEF DESCRIPTION OF THE DRAWINGS

The foregoing and other aspects of the disclosed subject matter will become apparent to those skilled in the art to which the disclosed subject matter relates upon reading the following description with reference to the accompanying drawings, in which.

DETAILED DESCRIPTION

Figure 1:
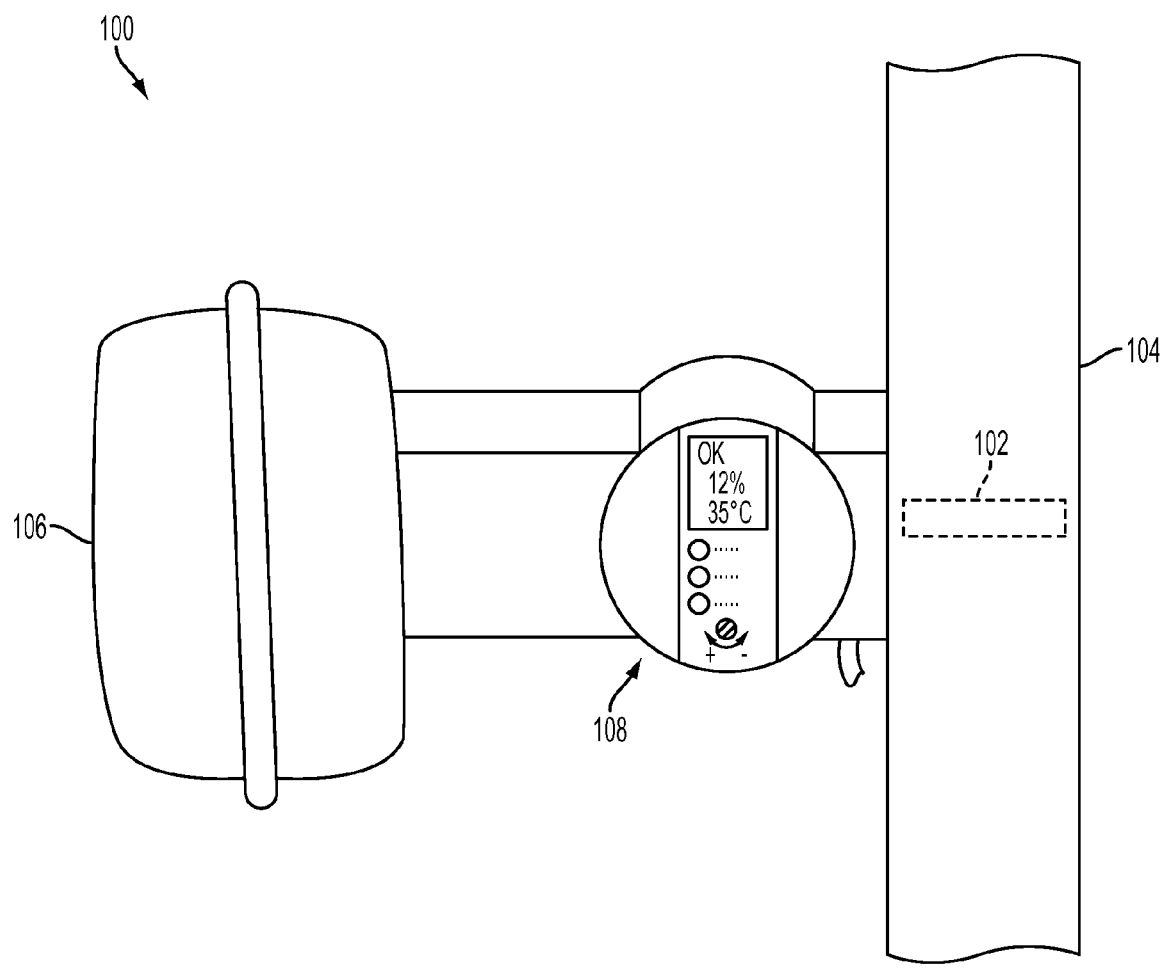
FIG. 1 is a perspective view of an example valve positioning system in accordance with at least one aspect of the present disclosed subject matter.

Example embodiments that incorporate one or more aspects of the disclosed subject matter are described and illustrated in the drawings. These illustrated examples are not intended to be a limitation on the disclosed subject matter. For example, one or more aspects of the disclosed subject matter can be utilized in other embodiments and even other types of devices. Moreover, certain terminology is used herein for convenience only and is not to be taken as a limitation on the disclosed subject matter. Still further, in the drawings, the same reference numerals are employed for designating the same elements.

A valve positioning system can be provided for transmitting information to a user. For example, the valve positioning system can receive information related to a component, structure, environment, etc., such as a valve. In some examples, this information may include status information, status information related to the valve, etc. This information can be transmitted to a user, such as by displaying a symbol that is indicative of the information on a display. The user can use a mobile device, tablet, handheld device, etc. to read the symbol that is displayed on the display, such that the user can determine the status information. Other embodiments are within the scope of the disclosed subject matter.

FIG. 1 illustrates an example valve positioning system 100. The valve positioning system 100 can be used in a number of different environments. For example, the valve positioning system 100 can be used in association with a pipeline transportation system that includes the transportation of materials (e.g., liquids, gases, etc.) through a pipe.

The valve positioning system 100 can include a valve 102. It will be appreciated that the valve 102 is illustrated generically/schematically in FIG. 1 with dashed lines, as the valve 102 is normally not visible in such a view. Indeed, the valve 102 may not be limited to the illustrated position, but, instead, is merely an example of where the valve 102 may be positioned. Further, the valve 102 is merely exemplary, and is not intended to convey a particular size, shape, location, etc., as the valve 102 may include any number of different sizes, shapes, locations, etc.

In an example, the valve 102 may be positioned within a pipe 104 through which the materials are transported. The valve 102 can selectively restrict flow of the materials through the pipe 104. For example, the valve 102 may be moveable between an opened position and a closed position. In the opened position, the valve 102 may not restrict the flow of materials through the pipe 104. In the closed position, the valve 102 may partially or completely restrict the flow of materials through the pipe 104. In some examples, in addition to the opened position and the closed position, the valve 102 can be moved to a partially opened position (e.g., neither fully opened nor fully closed).

The valve positioning system 100 typically includes an actuator 106. The actuator 106 can be in operative association with the valve 102, such as by being attached to the valve 102, for example. The actuator 106 can control the operation of the valve 102, such as by moving the valve 102 between the opened position, the partially opened position, and the closed position. In an example, the actuator 106 may include a pneumatic actuator, in which air pressure acts as the power source for moving the valve 102. In one possible example, the air pressure can act on a piston to provide thrust for moving the valve 102. In some examples, air moving in a first direction can move the valve 102 to the closed position while air moving in an opposing second direction can move the valve 102 to the opened position.

The valve positioning system 100 typically includes a valve positioner 108. The valve positioner can be in operative association with the valve 102 and/or the actuator 106. By being in operative association, the valve positioner 108 can be connected to one or more sensors, cameras, pressure gauges, etc. that may be used to sense, detect, monitor, etc. a status of the valve 102 and/or the actuator 106. As such, in this example, the valve positioner 108 can receive status information related to the valve 102. For example, the status information that the valve positioner 108 can receive may include one or more of the following: a position of the valve 102 (e.g., opened position, partially opened position, closed position), position deviation of the valve 102 (e.g., how much an actual position of the valve 102 deviates from an intended position of the valve 102), a time history of the valve 102 (e.g., time that the valve 102 may be in the opened position, partially opened position, or closed position), air supply information (e.g., air supply for the actuator 106 may be too high or too low), errors and/or malfunctions related to the valve 102 and/or the actuator 106, etc.

Figure 2:
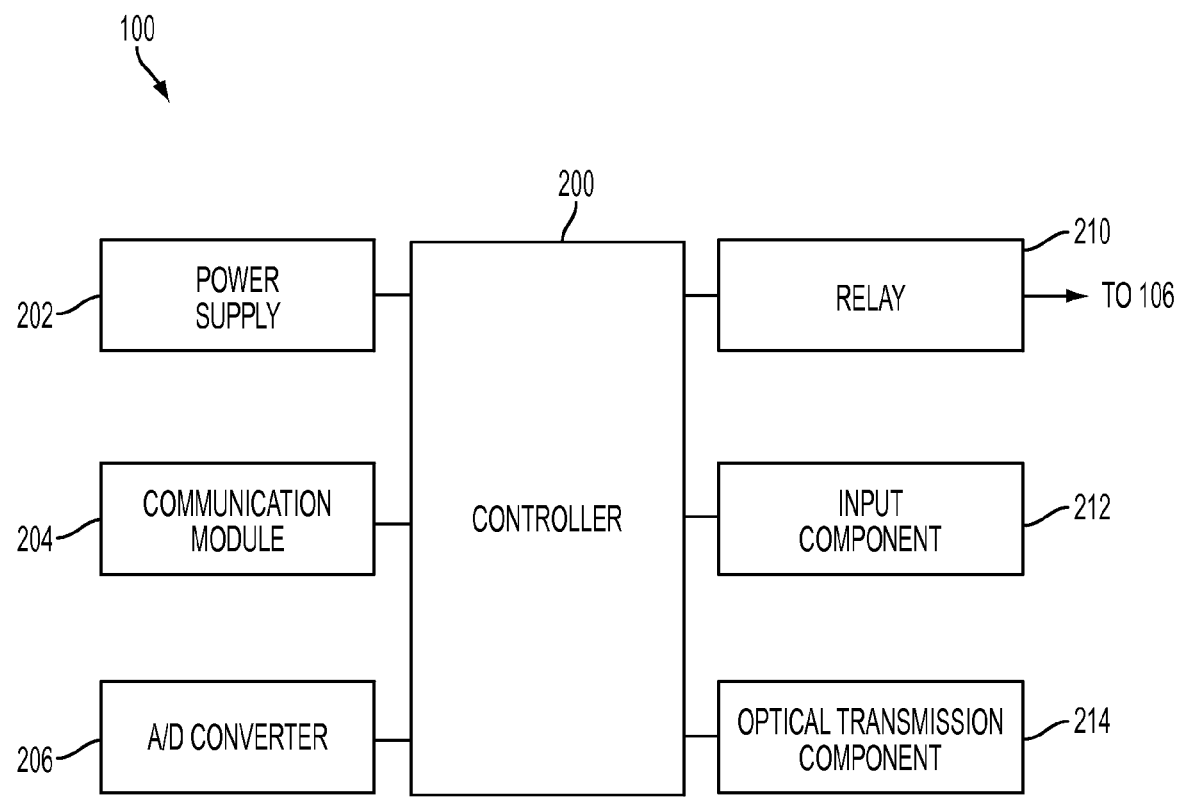
FIG. 2 is a schematized block diagram of example components within an example valve positioning system.

Turning to FIG. 2, a schematic representation of the valve positioning system 100 is illustrated. It will be appreciated that the schematic representation illustrates some, but not all, of the components, structures, etc. of the valve positioning system 100. Indeed, the valve positioning system 100 is not limited to the illustrated components, structures, etc. that are illustrated in FIG. 2, and, in other examples, may include other components, structures, etc.

The valve positioning system 100 can include a controller 200. In an example, the controller 200 may include a processor, memory, an input/output, circuitry, etc. In some examples, the controller 200 may include a microcontroller. The controller 200 may be supported within the valve positioner 108 (e.g., illustrated in FIG. 1), such as by being positioned within and/or supported by the valve positioner 108.

The valve positioning system 100 can include a power supply 202. The power supply 202 can be in operative association with the controller 200, such that the power supply 202 can supply electric power to one or more of the components of the valve positioning system 100. The power supply 202 can include any number of devices, including, but not limited to, electrical energy transmission systems, batteries, electromechanical power systems (e.g., generators, alternators, solar power cells, etc.), etc.

The valve positioning system 100 can include a communications module 204. The communications module 204 can be in operative association with the controller 200. In an example, the communications module 204 can send and/or receive data to and/or from the controller 200. Though not illustrated, the communications module 204 may include a microcontroller, memory, etc. In one possible example, the communications module 204 may include a Highway Addressable Remote Transducer ("HART") protocol. In such an example, the communications module 204 can send and/or receive digital information across analog wires between an external device and the controller 200. While the power supply 202 and the communications module 204 are illustrated as two separate components, in other examples, the power supply 202 and the communications module 204 may be comprised as part of a single component, such as a component that can transmit both power and data/information.

The valve positioning system 100 can include an analog-to-digital ("A/D") converter 206. The A/D converter 206 can be in operative association with the controller 200. In an example, the A/D converter 206 can convert between analog signals/data and digital signals/data before the signals/data may be received by the controller 200. In an example, the data that may be received by the controller 200 from either or both of the communications module 204 and/or the A/D converter 206 can include the status information that may be related to the valve 102.

The valve positioning system 100 can include one or more relays 210. In the illustrated example, the relay 210 may be in operative association with the controller 200, such as by being electrically connected to the controller 200. The relay 210 can be powered by the controller 200 and/or can be controlled by the controller 200. The relay 210 can be electrically connected to the actuator 106, such that the relay 210 can control the actuator 106. In this example, the controller 200, by being electrically connected to the relay 210, can control the actuator 106 and/or the valve 102.

The valve positioning system 100 can include an input component 212. In this example, the input component 212 may be in operative association with the controller 200, such as by being electrically connected to the controller 200 via, for example, a universal serial bus (e.g., "USB") connection. The input component 212 can be supported by and/or attached to the valve positioner 108. In one example, the input component 212 may include any number of text entry devices, such as keyboards, keypads, wireless input devices, wired input devices (e.g., via a mobile device, tablet, handheld device, etc.), etc. In these examples, the input component 212 allows for a user to input information to the controller 200, such as control information, status information, data requests, on/off commands, etc.

The valve positioning system 100 can include an optical transmission component 214. In some examples, the optical transmission component 214 may include one or more displays, screens, input devices (e.g., keypad(s), etc.), etc. The optical transmission component 214 can be in operative association with the controller 200, such as by being electrically connected to the controller 200. In an example, the optical transmission component 214 can be supported by and/or attached to the valve positioner 108. As will be described in more detail below, in one example, the optical transmission component 214 can include a graphical display. In an example, the optical transmission component 214 can transmit (e.g., optically transmit) information to a separate device from the valve positioning system 100, such as a computing device (e.g., mobile device, tablet, handheld device, etc.), for example.

Figure 3:
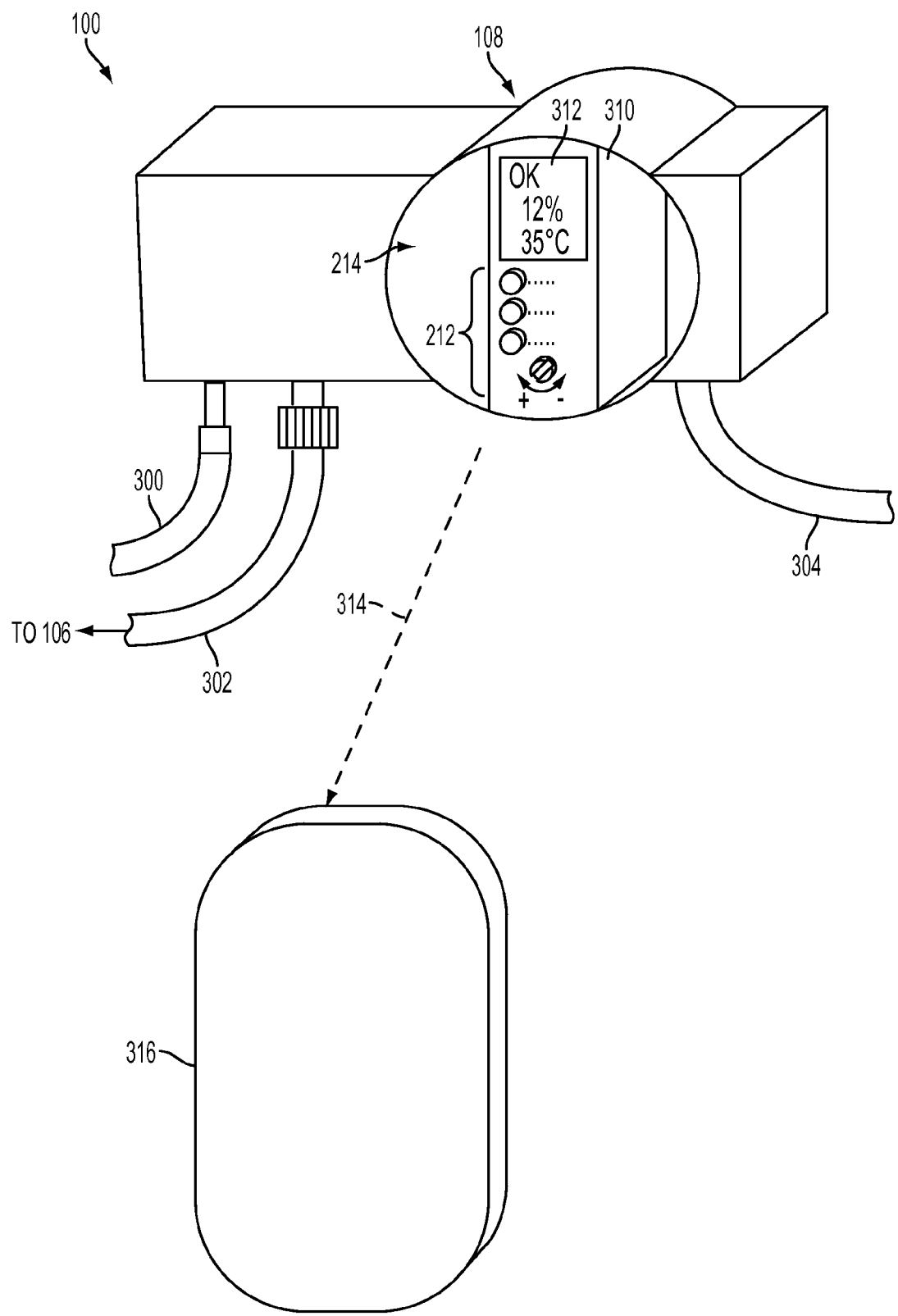
FIG. 3 is an example valve positioner for positioning a valve in a valve positioning system.

Turning to FIG. 3, another example of a portion of the valve positioning system 100 is illustrated. In this example, for the purposes of illustration, the valve positioner 108 is illustrated separate from the valve 102, the pipe 104, the actuator 106, etc. In operation, however, the valve positioning system 100 may include the valve 102, the pipe 104, the actuator 106, the valve positioner 108, etc., in a similar manner as illustrated in FIGS. 1 and 2.

The valve positioning system 100 can include a first air supply 300 and a second air supply 302. The first air supply 300 and the second air supply 302 can include pipes, hoses, tubes, conduits, or the like through which air can be passed. In an example, the first air supply 300 may be an air intake supply into which air can be drawn in. The first air supply 300 and the second air supply 302 can be attached to the valve positioner 108. The air from the first air supply 300 can be selectively dispensed to the second air supply 302. The second air supply 302 can be attached to the actuator 106, such that the second air supply 302 can supply air to the actuator 106. A supply 304 can be attached to the valve positioner 108 for providing power and/or data communication to the valve positioner 108.

Focusing upon the valve positioner 108, the valve positioner 108 can include a positioner interface 310. The positioner interface 310 may include a display, a screen, or other similar device for displaying information. The positioner interface 310 can support one or more components, including, for example, the input component 212, the optical transmission component 214, etc. In some examples, the positioner interface 310 comprises a surface or structure that can support the display, screen, etc.

In this example, the optical transmission component 214 of the valve positioner 108 may include a graphical display 312 supported on the positioner interface 310 of the valve positioner 108. The graphical display 312 may include, for example, a screen, a volumetric display, monitor, or other similar visual displays that can display two dimensional and/or three dimensional representations. In some examples, the graphical display 312 can be in color or black and white. The graphical display 312 can display information related to the valve 102. For example, the graphical display 312 can display information that may include status information (e.g., position of the valve 102, position deviation of the valve 102, time history of the valve 102, air supply information, etc.).

Figure 4A:
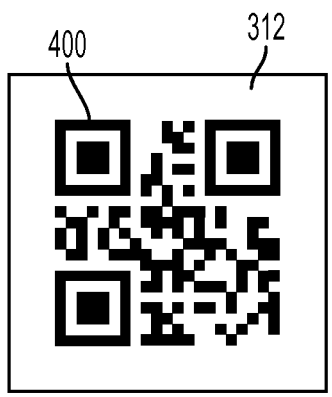
FIG. 4A is an example graphical display for displaying a graphical representation.
Figure 4B:
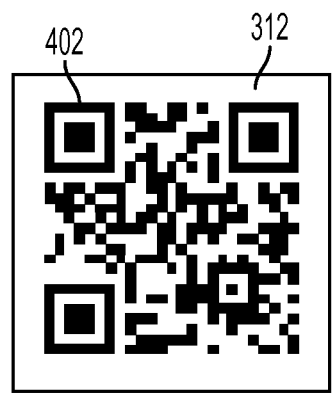
FIG. 4B is an example graphical display for displaying a second graphical representation.
Figure 5:
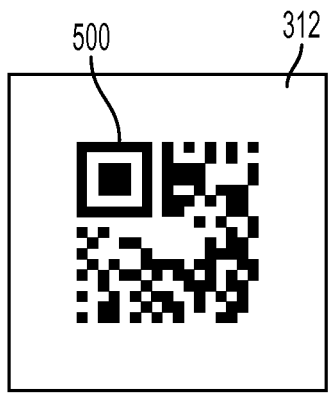
FIG. 5 is an example graphical display for displaying a graphical representation.
Figure 6:
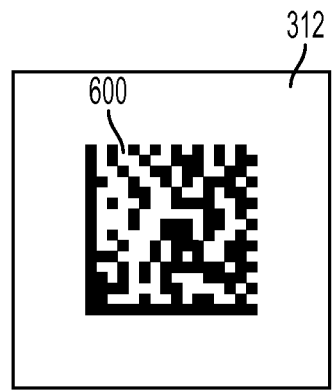
FIG. 6 is an example graphical display for displaying a graphical representation.

In one possible example, the graphical display 312 can display one or more graphical representations (e.g., illustrated with respect to FIGS. 4 to 6). The graphical representations can include, for example, status information related to the valve 102. In the illustrated example of FIG. 3, the graphical display 312 can display a human-readable graphical representation that may include text, images, pictures, or the like. For example, the human-readable graphical representation in the example of FIG. 3 may include the text "OK 12% 35° C." As such, a user, operator, technician, or other person can see this information and determine whether the valve positioning system 100 is operating properly. In some examples, the human-readable graphical representations can include error information related to the valve 102, or the like.

In addition to the graphical display 312 displaying human-readable graphical representations that may be visually readable by the user, the graphical display 312 can display graphical representations that may be machine-readable by a computing device 316 but may or may not be readable by the user. For example, the graphical display 312 can display graphical representations such as one or more barcodes (e.g., matrix barcodes, etc.) that vary based on the status information of the valve positioning system 100. In this example, the status information can include position information of the valve 102, error information of the valve 102, etc. Also, in some examples, concerning not being readable by the user, the graphical representations (e.g., matrix barcodes) can be displayed in a predetermined order so as to transmit a variety of different information related to the valve positioning system 100. The speed and/or the patterning of the display of the graphical representations may be beyond the ability of the user to view, perceive, and/or comprehend, thus being readable solely by a machine (e.g., the computing device 316).

In an example, the speed of the display of the graphical representations may include a graphical frames per second rate (e.g., a duration of display, a time between separate displays, etc.) of the graphical representations. In such an example, when the graphical frames per second rate exceeds a predetermined threshold (e.g., 30 blinks/displays per second, 60 blinks/displays per second, etc.), a user may not be able to read and/or detect the different graphical representations. By displaying the graphical representations in a way that may be machine-readable by the computing device 316, it will be appreciated that machine-readability also may include non-human perceivable selective illumination. That is, the graphical representations can be selectively displayed in a manner as described herein that may be non-human perceivable. For example, to provide for non-human perception, the graphical representations can be displayed at a graphical frames per second rate that exceeds a predetermined threshold, such that a user cannot read and/or detect the graphical representations.

By displaying one or more graphical representations on the graphical display 312, the valve positioner 108 can optically transmit 314 the status information to a computing device 316. In this example, the computing device 316 may be in an unobstructed line of sight with the graphical display 312 of the valve positioner 108 such that a camera, photo-detector, etc. of the computing device 316 can capture and/or detect the graphical representations.

In an example, the computing device 316 can include predetermined information related to the graphical representations that may be displayed on the graphical display 312. For example, the computing device 316 can include predetermined information that correlates one or more of the graphical representations (e.g., matrix barcodes) with status information of the valve positioning system 100. In a possible example, one of the graphical representations may be correlated with a first status information of the valve positioning system 100 within the computing device 316. As such, once the computing device 316 detects the graphical representation that may be displayed, the computing device 316 can determine the status of the valve positioning system 100 based on the predetermined information in the computing device 316. In an example, the computing device 316 can recognize the graphical representations that are displayed on the graphical display 312 and correlate one or more of the graphical representations (e.g., matrix barcodes) with status information of the valve positioning system 100 in real time. As such, in such an example, this recognition of the graphical representations and decoding of the information represented by the graphical representations can occur in real time. The operator can therefore determine the status information in real time or near real time (e.g., subject to processing delays).

Turning to FIGS. 4A and 4B, an example of the graphical display 312 displaying a graphical representation 400 is illustrated. In this example, the graphical representation 400 may include a matrix barcode. In particular, in this example, the graphical representation 400 may include a quick response (QR) code. The graphical representation 400 may be a machine-readable optical label that contains information about the status information of the valve positioning system 100. However, in some examples, QR codes are not required and other types of machine-readable images can be used.

In this example, the graphical representation 400 can be displayed on the graphical display 312 based on a first status information. The graphical representation 400 (e.g., a QR code) can have a plurality of color modules (e.g., square dots) that may be arranged in a grid-like pattern with a contrast background. The arrangement of the color modules may be representative of the first status information of the valve positioning system 100. The graphical display 312 can display the graphical representation 400 for a period of time, such as less than about one second, less than about 0.5 seconds, less than about 0.25 seconds, etc.

Turning to FIG. 4B, in some examples, after the graphical representation 400 may be displayed, the graphical display 312 can display a second graphical representation 402. In this example, the second graphical representation 402 may include a matrix barcode. In particular, in this example, the second graphical representation 402 may include a quick response (QR) code. The second graphical representation 402 may be a machine-readable optical label that contains information about the status information of the valve positioning system 100.

In some examples, the second graphical representation 402 can be different than the graphical representation 400. For example, while the graphical representation 400 may be representative of the first status information of the valve positioning system 100, the second graphical representation 402 can be representative of a second status information of the valve positioning system 100. That is, the arrangement of the color modules of the second graphical representation 402 may be representative of the second status information of the valve positioning system 100. The graphical display 312 can display the second graphical representation 402 for a certain period of time. In an example, the graphical display 312 can display the second graphical representation 402 within a certain period of time after the graphical representation 400 may be displayed.

The second graphical representation 402 can be displayed in a serial manner (e.g., after the graphical representation 400) for any number of reasons. In a possible example, if the graphical representation 400 is incapable of conveying all of the status information with a single graphical representation, such as when a relatively large quantity of information, data, etc. is being transmitted, the second graphical representation 402 can be displayed after the graphical representation 400 so as to convey all of the status information (e.g., as the first status information and the second status information). In another example, the second graphical representation 402 can provide subsequent information, such as real time and/or successive updates to the graphical representation 400. In such an example, the graphical representation 400 can be indicative of the first status information at a first time period while the second graphical representation 402 can be indicative of the second status information at a second time period after the first time period. In another example, the graphical representation 400 can trigger and/or enable reading of the second graphical representation 402 or vice versa. Indeed, the second graphical representation 402 (and, in some examples, subsequent graphical representations) can be displayed for any number of reasons, such as for one or more of the reasons described above or for other reasons.

It will be appreciated that the graphical representation 400 and the second graphical representation 402 may be merely exemplary, as any number of graphical representations are envisioned. Additionally, while two graphical representations (e.g., the graphical representation 400 and the second graphical representation 402) are illustrated as being displayed one after another by the graphical display 312, the graphical display 312 may not be limited to displaying two graphical representations. Rather, in other examples, one or more graphical representations can be displayed by the graphical display 312. The computing device 316 can read the one or more graphical representations (e.g., 400, 402, etc.) to determine the status information of the valve positioning system 100.

In the examples of FIGS. 4A and 4B, the computing device 316 can optically detect the graphical representations that may be displayed by the graphical display 312. For example, the computing device 316 can first detect the graphical representation 400. Next, the computing device 316 can detect the second graphical representation 402. In response to detecting the graphical representations and the order of the graphical representations, the computing device 316 can subsequently determine the first status information, the second status information, etc. of the valve positioning system 100.

Turning to FIG. 5, another example of a graphical representation 500 is illustrated. In this example, the graphical representation 500 may include a micro quick response (QR) code. The micro QR code may be a smaller version of the QR code that was illustrated and described with respect to the graphical representation 400 of FIG. 4A and the second graphical representation 402 of FIG. 4B. In one possible example, the graphical representation 400 and/or the second graphical representation 402 (e.g., the QR code) can have 177×177 modules and display up to 4296 characters of alphanumeric data. In another example, the graphical representation 500 (e.g., the micro QR code) can have a range of about 11×11 modules to about 17×17 modules. It will be appreciated that the aforementioned number of modules are not intended to be limiting, but, rather, merely examples. As such, in other examples, the graphical representation 400 may include more than or less than the described number of modules and/or characters of alphanumeric data. The micro QR code (e.g., illustrated in FIG. 5) can therefore represent a smaller version of the QR code (e.g., illustrated in FIGS. 4A and 4B).

The graphical representation 500 can be used in a similar manner as the graphical representation 400 and the second graphical representation 402 that are illustrated and described with respect to FIGS. 4A and 4B. For example, the graphical display 312 can display one or more graphical representations 500. The graphical representations 500 can be representative of status information (e.g., the first status information, the second status information, etc.) of the valve positioning system 100. It will be appreciated that the status information may not be limited to the first status information and/or the second status information. Rather, in another example, the status information may include other status information, such as arbitrary information that may be displayed by the graphical representations 500.

The computing device 316 can optically detect the graphical representation(s) 500 that may be displayed by the graphical display 312. In response to detecting the graphical representation(s) 500 and the order of the graphical representation(s) 500, the computing device 316 can subsequently determine the first status information, the second status information, etc. of the valve positioning system 100.

Turning to FIG. 6, another example of a graphical representation 600 is illustrated. In this example, the graphical representation 600 may include a data matrix. A data matrix may be a two dimensional matrix barcode that may include a plurality of colored and contrasting modules arranged in a grid-like pattern. In a possible example, the two dimensional matrix barcode can have black modules and contrasting white modules that may be machine readable. In an example, the data matrix can have a data size ranging from a few bytes to about 1556 bytes. In a possible example, the data matrix can display up to about 2335 alphanumeric characters.

The graphical representation 600 can be used in a similar manner as the graphical representations (e.g., 400, 402, 500, etc.) that are illustrated and described with respect to FIGS. 4A, 4B and 5. For example, the graphical display 312 can display one or more graphical representations 600. The graphical representations 600 can be representative of status information (e.g., the first status information, the second status information, etc.) of the valve positioning system 100. The computing device 316 can optically detect the graphical representation(s) 600 that may be displayed by the graphical display 312. In response to detecting the graphical representation(s) 600 and the order of the graphical representation(s) 600, the computing device 316 can subsequently determine the first status information, the second status information, etc. of the valve positioning system 100.

Figure 7:
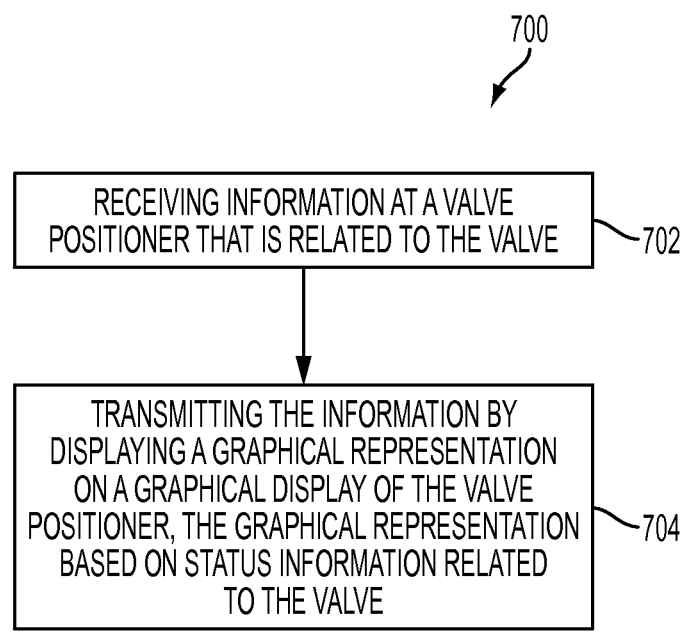
FIG. 7 is a flow chart for an example method of exchanging information related to a valve in a valve positioning system.

Turning now to FIG. 7, an example method 700 of exchanging information related to the valve 102 in the valve positioning system 100 is illustrated. In an example, a user may desire to know a status of a portion of the valve positioning system 100, such as information related to the valve 102. The user can have a hand held device, such as the computing device 316. The user can approach the valve positioner 108 with the computing device 316. In an example, the method 700 may include a step 702 of receiving information at the valve positioner 108 that may be related to the valve 102. In such an example, the valve positioner 108 may include the controller 200, such that the controller 200 can receive the information related to the valve 102. In some examples, this information may include, but is not limited to, the valve position, the valve health, an air supply pressure of the actuator 106, etc. The user can receive the information from the valve positioner 108 by using the computing device 316 to read the graphical representation.

The method 700 may include, at step 704, transmitting the information by displaying a graphical representation (e.g., 400, 402, 500, 600) on the graphical display 312 of the valve positioner 108 to the computing device 316. In some examples, the graphical representation (e.g., 400, 402, 500, 600) may be based on the status information that may be related to the valve 102. As illustrated in FIGS. 4, 5 and 6, the graphical display 312 can display one or more graphical representations. The graphical representations can be based on the status information (e.g., a first status information, a second status information, etc.).

The valve positioning system 100 provides a number of benefits for exchanging information between the valve positioning system 100 and the user, and also for exchanging information between the valve positioning system 100 and the computing device 316. For example, the exchange of information between the valve positioning system 100 and the computing device 316 can occur when the computing device 316 may be in a line of sight with the valve positioner 108. Indeed, the computing device 316 can be in a line of sight with the graphical display 312. As such, information can be transmitted between the valve positioning system 100 and the computing device 316 with limited risk of crosstalk between the computing device 316 and another, unintended, valve positioning system. Further, by exchanging this information optically and not wirelessly (e.g., with Bluetooth, with radio waves, etc.), the likelihood of crosstalk between the computing device 316 and other, unintended, valve positioning systems may be reduced.

To the extent that the claims recite "at least one of X and Y" (or any similar phrase), this is intended to be interpreted as "one or both of X and Y" rather than "at least one X and at least one Y."

The disclosed subject matter has been described with reference to the example embodiments described above. Modifications and alterations will occur to others upon a reading and understanding of this specification. Example embodiments incorporating one or more aspects of the disclosed subject matter are intended to include all such modifications and alterations insofar as they come within the scope of the appended claims.

The invention claimed is:

1. A valve positioning system, comprising:
a valve configured to selectively restrict flow of material in a pipe; and
a valve positioner in operative association with the valve, the valve positioner comprising a controller and a display coupled with the processor,
wherein the controller is configured to:
receive status information related to the valve,
generate different graphical representation for the status information in machine-readable format decodable only by remote computing device, and
operate the display to display a series of the different graphical representations at a graphical frames per second rate that is set above a threshold so as to be imperceptible to humans, wherein, by displaying the different graphical representations, the valve positioner is configured to optically transmit the status information.

2. The valve positioning system of claim 1, wherein the status information includes position information of the valve.

3. The valve positioning system of claim 1, wherein the status information includes error information of the valve.

4. The valve positioning system of claim 1, wherein the status information includes at least one of a first status information, a second status information and other status information.

5. The valve positioning system of claim 1, wherein the series of the different graphical representation comprises a first graphical representation and a second graphical representation that is different from the first graphical representation.

6. The valve positioning system of claim 5, wherein the first graphical representation is based on the first status information.

7. The valve positioning system of claim 6, wherein the second graphical representation is based on the second status information.

8. The valve positioning system of claim 1, wherein the series of the different graphical representations is in a predetermined order so as to convey the status information.

9. The valve positioning system of claim 1, wherein the graphical representation comprises a Quick Response (QR) code.

10. The valve positioning system of claim 1, wherein the graphical representation comprises a micro Quick Response (QR) code.

11. The valve positioning system of claim 1, wherein the graphical representation comprises a data matrix.

12. A valve positioner, comprising:
a controller with a processor, the controller configured to be in operative association with a valve configured to selectively restrict flow of material in a pipe such that the valve positioner is configured to receive status information related to the valve; and
a display coupled with the controller,
wherein the controller is configured to:
generate a first graphical representation and a second graphical representation, which is different from the first graphical representation, for the status information in machine-readable format decodable only by a remote computing device,
operate the display to display the first graphical representation and then the second graphical representation in succession so that the second graphical representation occurs after the first graphical representation at a graphical frames per second rate that is set above a threshold so as to be imperceptible to humans;
wherein, for purposes of determining the status information, the graphical frames per second rate between the first graphical representation and the second graphical representation requires use of the remote computing device in a line of sight with the display.

13. A method of exchanging information related to a valve in a valve positioning system, the method comprising:
receiving information at a valve positioner that is related to the valve;
using the valve positioner, generating a series of different graphical representations for the status information at a graphical frames per second rate that is set above a threshold so as to be imperceptible to humans and in machine-readable format decodable only by remote computing device; and
displaying the different graphical representations on a display of the valve positioner.

14. The method of claim 13, wherein the different graphical representations includes a two dimensional matrix barcode.

* * * * *